United States Patent [19]

Willard et al.

[11] Patent Number: 4,867,731

[45] Date of Patent: Sep. 19, 1989

[54] DETECTION OF INFESTATION OF BEES

[76] Inventors: Joel Willard, 61 S. Herbert, Riverside, Ill. 60546; Dean B. Willard, 619 Case Pl., Evanston, Ill. 60202

[21] Appl. No.: 168,232

[22] Filed: Mar. 15, 1988

[51] Int. Cl.$^4$ ............................................. A01K 47/06
[52] U.S. Cl. ......................................... 449/2; 43/114; 449/50
[58] Field of Search ................... 449/1, 18, 19, 50, 61; 47/23; 73/861.41, 864.74; 43/114, 115, 116, 117

[56] References Cited

U.S. PATENT DOCUMENTS

| | | | |
|---|---|---|---|
| 734,636 | 7/1903 | Truslow | 43/115 |
| 1,097,838 | 5/1914 | Bendall | 43/115 |
| 1,165,251 | 12/1915 | Harris | 43/115 |
| 1,201,796 | 10/1916 | Berg | 43/115 |
| 4,739,531 | 4/1988 | Robson | 449/19 X |

Primary Examiner—Robert P. Swiatek
Attorney, Agent, or Firm—Thomas W. Speckman

[57] ABSTRACT

A process and apparatus for detection of infestation of bees by organisms, such as parasites, particularly mites, in beehives, packages, and cages. The process and detector have a replaceable insert with an upwardly facing adhesive trapping surface with a spaced overlying screen having mesh openings sized to permit passage of infesting organisms while preventing passage of bees. The process and apparatus is particularly useful for rapid detection for the presence or absence of infesting organisms both in hives under field conditions and for purposes of certifying packages and cages free from infesting organisms and for evaluating the effectiveness of miticides for killing mites.

30 Claims, 1 Drawing Sheet

DETECTION OF INFESTATION OF BEES

BACKGROUND OF THE INVENTION

1. Field of the Invention

A process and apparatus for detection of infestation of bees by organisms, such as parasites, particularly mites, and the like, in beehives, packages, and cages.

2. 'Description of the Prior Art

Detection of infestation of bees by parasites, such as mites, has become of great importance since discovery of Varroa mites (VARROA-JACOBSONI) an external parasite of honey bees, were detected for the first time in North America in September, 1987. Within a short period after being infested with Varroa mites, healthy and productive bees begin a rapid decline and within two to three years after initial infestation, a hive will be totally destroyed. A limited survey for Varroa mite has resulted in its being found shortly thereafter in a total of thirteen states and in Canada. The need for more comprehensive surveys and better detection techniques including an improved, rapid and accurate screening detection system for Varroa mite infestation is important. The magnitude of the mite problem can be considered in view of the 4.5 million beehives located throughout the United States, especially in consideration of the fact that a significant proportion of these beehives are moved on a geographical and seasonal basis. The mite problem is also increased in view of the practice of shipping bees across state and country coundaries. There is an immediate need for improved mite detection and a means for certification of mite-free hives, packages, and cages housing bees.

One of the most commonly used procedures to detect the infestation of bees by mites is known as the "Roll Test". The Roll Test involves disassembling the top of a beehive and removing about 500 to 1000 bees, preferably from the brood frames, and placing them in a glass jar. Ether/alcohol is sprayed into the jar, the jar is capped and rotated and if mites are present, they can be observed as they will dislodge from the bees and adhere to the glass walls of the jar.

Another technique employed for detection of infestation of bees by mites is to similarly place 500 to 1000 bees in a glass jar and to kill the bees with a 70 percent alcohol solution. Shaking the container with the bees in the alcohol solution causes the mites to leave the bees. The bees can be strained out by passing the solution through a coarse screen and the mites can be isolated by straining the remaining solution through a very fine screen.

Another means of detection of infesters of bees is by removing sealed brood chambers from the hive and examining the contents of the comb for the infester, such as mites.

Present techniques for detection of tracheal mites is to kill individual bees, dissect the bee, remove the trachea, and examine for mites under a microscope.

The previous procedures for detection of infestations, such as mites on bees, requires sacrificing of a significant number of bees or brood and the processes are work intensive with the degree of detection accuracy not as high as desired.

SUMMARY OF THE INVENTION

It is an object of this invention to provide a detection system for detection of infestation of bees which results in a high level of assurance that any infestation is ascertained in surveyed hives, packages, or cages.

It is an object of this invention to provide a process for detection of infestation of bee in the field with little disturbance and stress upon the bees during the detection procedure.

It is an object of this invention to provide a process for detection of infestation of bees without destruction of the bees.

It is another object of this invention to provide field detection of infestation of bees without the need for laboratory analysis while providing that the specimens may be returned to a laboratory for further identification and detailed study and may be retained for permanent reference.

It is still another object of this invention to provide a process and apparatus for detection of infestation of bees in which the reliability is high, even in the case of light infestations, and which provides standardization allowing comparison of results performed by various investigators functioning under widely varying conditions.

It is yet another object of this invention to provide a process and apparatus by use of which infestation of bees can be determined in a very short time with low expenditure for equipment, materials and manpower.

It is another object of this invention to provide a process and apparatus for detection of infestation of bees which is applicable to standard and non-standard hives, packages, queen cages, and laboratory cages.

It is yet another object of this invention to provide a process and apparatus for rapid field detection of as well continued hive monitoring for infestation of bees which has high reliability with little disruption to standard bee keeping operations.

The terminology "infestation" and "organisms" as used throughout this description and claims is meant to include any organism significantly smaller than and during at least a portion of its life cycle is on the exterior of a bee. Although this invention is described in detail with respect to parasites such as mites, particularly the Varroa mite, it is meant to include other organisms including those which may spend a portion of their life cycle internally, such as Tracheal mites.

The process for detection of infestation of bees in accordance with this invention comprises placing below and open to a confinement means for bees, such as hives, packages, or cages, a detector comprising a frame and a replaceable detector insert. The detector removable insert fits into a frame and has an upwardly facing adhesive trapping surface with a spaced overlying screen having openings sized to permit passage of infesting organisms while preventing passage of bees. The overlying screen may be fastened over the top of the frame. The process will be described throughout this disclosure in detail with respect to detection of infestation of bees in beehives, but it should be readily apparent to one skilled in the art that the same process and apparatus may be modified in size as will be readily apparent and may be used in connection with any confinement means for bees, such as packages or cages. The process of this invention is particularly suited for rapid field detection of infestation of bees by inserting the detector into a beehive, below the lowest hive body and above the hive bottom. A replaceable detector insert having an upwardly facing adhesive trapping surface may be conveniently mounted and maintained in a frame and have a spaced overlying screen on top of the frame, the screen permitting passage of infesting organisms while preventing passage of bees and other undesired debris. The frame for use in a hive has a sloping forward edge and sits on the bottom board of the hive to provide a ramp for entry to the combs by the bees.

The detectors of this invention may be placed in the bottom of the beehive and remain in that position for long periods of time with periodic checking for infesting organisms on the trapping surface of the replaceable detector insert. This is easily achieved by simply removing the entire detector from the hive, and then removing the replaceable detector insert from the frame for visual inspection, and replacing the detector, if desired, into the hive. The Varroa mite may be observed with the naked eye or with a magnifying glass. The smaller tracheal mite may be observed through a microscope and/or with the aid of selective dying of the mite.

The detector of this invention may also be used for rapid determination of infesting organisms by placing the detector into the hive, as described above, followed by application of an organism irritant, such as a miticide. Smoke, particularly tobacco smoke, has been found to be an excellent mite irritant. Dried grass smoke may be satisfactorily employed by normal hive smoking techniques and tobacco smoke has been found to be particularly effective in achieving mite dropoff in short periods of time. The detectors of this invention may also be used for rapid and reliable determination of the effectiveness of irritants and lethal agents for specific infesting organisms, such as miticides.

BRIEF DESCRIPTION OF THE DRAWING

The above objects and further advantages of this invention will become apparent by description of preferred embodiments with reference to the drawing wherein.

DESCRIPTION OF PREFERRED EMBODIMENTS

Figure 1:
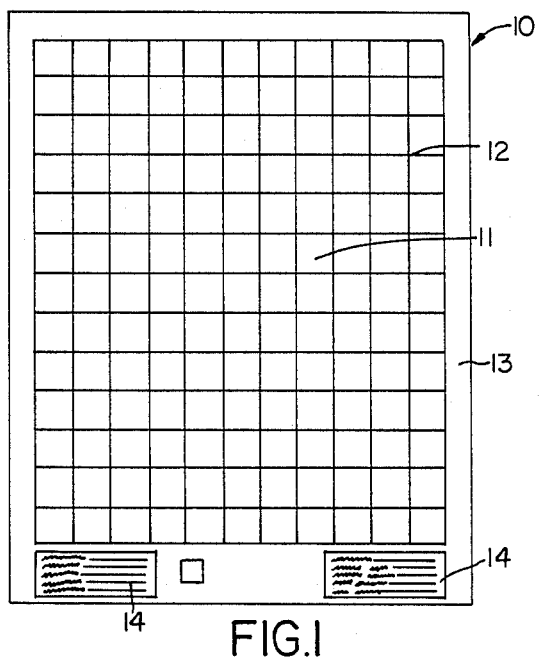
FIG. 1 is a top view of a replaceable detector insert sheet for use in one embodiment of this invention.

FIG. 1 shows one preferred embodiment of a suitable replaceable detector insert sheet 10 for use in this invention. The detector insert sheet 10 is preferably a white, plastic coated paperboard, printed with grid 12 and border 13 having identification boxes 14. In a preferred embodiment, the printing is in orange for ease in infecting organism identification and the grid pattern is lettered at the top of the columns and numbered in the horizontal rows for identification of infecting organism drop pattern and for aiding infecting organism counting. The printed border is free of sticky material and provides for ease of handling and insertion into the detector frame. The bottom border may contain two data blocks with space for notations, such as, the name of the bee keeper, address of the apiary, hive number and insert number, together with space for dates the insert was placed into service and removed, the name of the inspector, acricide used, date of application, and the number of infesting organisms found on the detector. The central trapping surface 11 is covered with any suitable non-drying adhesive suitable for holding the infesting organism. Polybutylene-based glue with suitable tackifier, as known to the art for insect traps, is suitable. To protect the trapping surface during shipping and handling prior to use, a cover sheet of corrugated paperboard, having open corrugations, may be used and should be removed and discarded before the detector insert is slid into the detector frame. After being removed from the detector frame, the detector insert trapping surface may be covered with a specimen protective cover, such as 2 mil polyester sheet, optically clear, to provide protection to the organisms stuck to the trapping surface during handling and storage of the used detector insert and to provide visual observation of the organisms in the laboratory and even following storage for some period of time.

Figure 2:
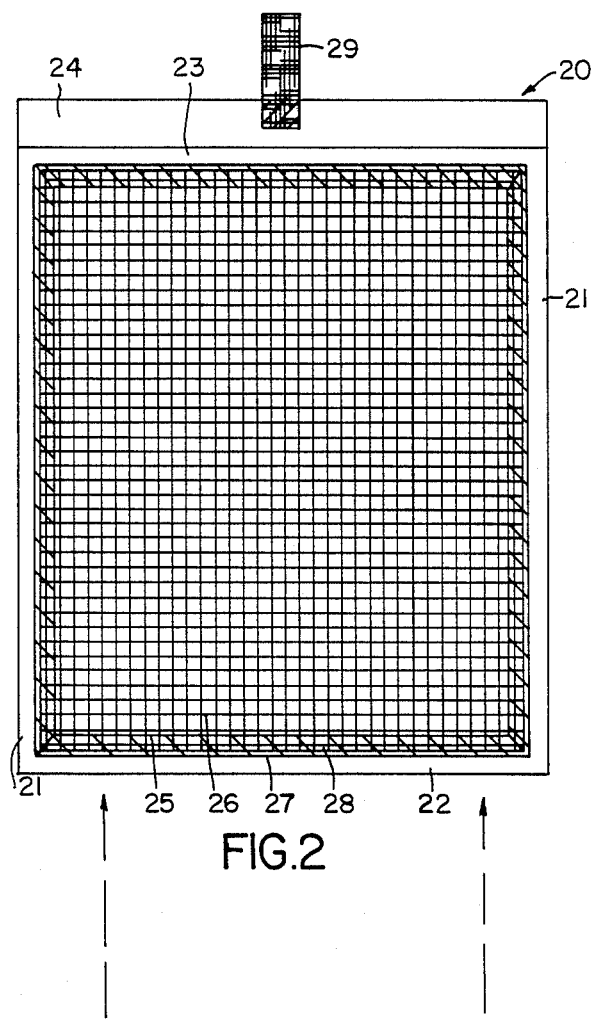
FIG. 2 is a top view of a detector frame for use in one embodiment of this invention.

FIG. 2 shows detector frame 20 having side frames 21, back frame 22 and front frame 23. The front and side frames are provided with detector insert grooves 25 for retaining the replaceable detector insert. Back frame 22 has a slot to provide access to the detector insert grooves and to allow sliding of the replaceable detector insert into place in the detector frame. Detector front frame 23 has sloping ramp 24 to provide bees easy access to the combs above the detector when the detector is in place in a conventional hive, as will be more fully described below. Pull tab 29 is fastened to front detector frame 23 for easy removal of the detector from the hive entrance space. The detector frame may be fabricated from any suitably durable material, such as wood or plastic.

Screen 26 is retained on the top surface of detector frame 20 and may be readily maintained in place by screen splines 28 fitting within screen grooves 27 surrounding the opening of the detector frame. Any suitable screen material may be used with a mesh size dependent upon the size of the particular infesting organism under consideration, but sized in a sufficiently small mesh to prevent the bees from coming into contact with the adhesive surface of the detector insert while allowing the infesting organism to fall through to trapping surface 11. In preferred embodiments, fiberglass screen is used and may have mesh openings of about 2 mm to about 6 mm, preferably about 2 mm to about 4 mm.

The detector of this invention comprising the replaceable detector insert placed within the detector frame providing an upwardly facing adhesive trapping surface and a spaced overlying screen having mesh openings sized to permit passage of investing organisms while preventing passage of bees, may simply be laid on a countertop with packages or cages containing bees, both open on the bottom, placed directly over the detector. The detector insert trapping surface will capture and hold organisms which dislodge from the bees and fall through the screen. Organism irritants may be used to more quickly dislodge the organisms from the bees to more rapidly determine infestation or freedom of infestation of bees in the package or laboratory cage. Thus, the detectors of this invention may be used to quickly certify organism-free packages or to test the effectiveness of various treatments to dislodge or kill the organisms under laboratory conditions.

A particularly important use of the detector of this invention is in the quick ascertainment of hive infestations by certain organisms on the bees so that infestation may be quickly determined or hives certified to be organism-free. Another important use of the detector of this invention is for continual monitoring of hives wherein the detector remains in the hive for fairly long periods of time.

Figure 3:
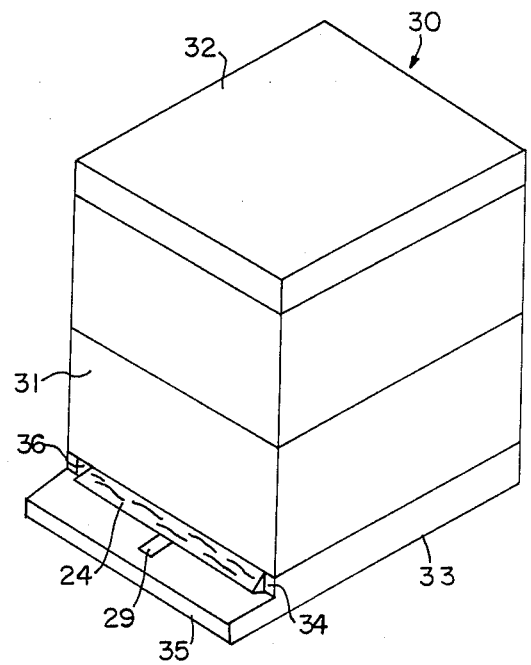
FIG. 3 is a perspective view of a hive stack with a detector of one embodiment of this invention in place on the hive bottom board.

The detector of this invention may be easily placed in standard hives by simply sliding the detector through the entrance to the hive. A conventional stack of hives 30 is shown in FIG. 3 with hive bodies 31, hive top 32 and hive bottom 33. Hive bottom 33 has sideboards 34 extending upwardly from bottom board 35 on two sides and the back forming an open hive entrance 36 at the front between the sideboards, bottom board and the bottom of the lowermost hive body. The detector is slid into this hive entrance with sloping front detector frame 24 facing the opening and providing pull tab 29 exposed at the front of the opening. The detector is pushed into place tightly so that the back piece of the bottom board assembly comes into contact with the back of the detector frame so that bees cannot come into contact with the detector trapping surface. To employ the detector in operating hives, any wax buildup hanging down from the frames must be removed and the bottom board scraped clean of wax buildup and hive debris. This can be easily accomplished by a bottom board scraper. In the case of non-standard hives, the lowermost hive body 31 can be removed or tilted upwardly from one side or from the front to provide space for placement of the detector and the hive body may then be set back into place. There is sufficient space between the hive bottom board and the hive frames to accommodate the detector.

A detector in accordance with one embodiment of this invention was made having an overall wooden frame size of 14 inches wide by 17¼ inches long. One inch wide by ⅝ inch thick wood sides and back were formed into a rectangular frame with a front piece 2¼ inches wide by ⅝ inch thick. The front piece had a full width 1¼ inch sloping ramp from the bottom to the top of the frame. The back piece of the frame had a ¼ inch cutout up to ½ inch from each end leaving a full thickness end piece at each end of the back. A ⅛ inch wide, 3/16 inch deep groove was located ¼ inch above the bottom surface along the full inner surface of the sides, front and full thickness ends of the back as an insert groove. A durable plastic or fabric pull strip extending forwardly was attached to the lower surface of the front frame. Fiberglas mesh having openings of about 2 mm×2 mm was installed over the top of the frame by anchoring it in a spline groove around the upper surface of the frame. A white, plastic coated, paperboard insert 12¼ inches by 15¼ inches with an orange border with incorporated data blocks and marked into one inch squares was coated with a non-drying glue adhesive trapping surface. The paperboard detector insert was inserted from the back side into the insert groove of the detector frame.

A detector as described above may be installed in conventional beehives by sliding it through the hive entrance, below the lowest comb and above the hive bottom, with the sloping front frame sloping upwardly to allow bees access the comb.

Tests using the detector of this invention as described above were conducted for detection of Varroa mites in bee colonies in Illinois and Florida in the late fall of 1987 and winter of 1988. Using the detector with no irritant chemical, it was found that it could take up to 1 to 8 days to detect a first mite in colonies which were known to be positive. By placing an infestor irritant, a strip of acricide Fluvalinate impregnated plywood, into the hive of one of the same colonies, overnight observation resulted in over 2100 mites on the detector insert in one colony and in another colony, 142 mites on the detector insert in a case which had not shown any mites after seven days of the natural dropoff.

A detector of this invention was inserted into a two-story Varroa mite infested hive. A heaping tablespoon of pipe tobacco was placed in a well lit bee smoker and the hive was heavily smoked at the entrance for 2½ minutes. The colony was in a fairly tight cluster in the upper center of the top hive body prior to smoking. The detector was read after five minutes and contained 22 mites.

A number of tests have shown reliable detection using strips of Fluvalinate (Apistan) placed in a hive with the detector being read from one hour to a few days after insertion. Thus, when using Fluvalinate in the hive, it is felt that at least one hour or more is necessary to obtain reliable detection of Varroa mites, especially in lowly infested hives.

Several tests have been conducted using dry grass smoke and particularly dry grass smoke enhanced with tobacco smoke or tobacco smoke alone as an irritant and in these cases, after one to three minutes of smoking the detector was read at from about on to five minutes after smoking and Varroa mites reliably detected. In Florida, the detector system was used as a detection and calibration device to determine the efficacy of various acricides under test in hives, cages and bee packages.

In other tests, roll tests were conducted on hives and detectors of this invention installed in the same hives showed a higher degree of Varroa mite detection accuracy than the roll test, particularly when various acricides were used or when the hive was smoked.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for detection of infestation of bees comprising:
   placing below and open to a confinement means for bees a detector system comprising a paperboard insert having an upwardly facing printed grid and adhesive trapping surface and having a spaced overlying screen having mesh openings sized to permit passage of infesting organisms while preventing passage of bees.

2. A process according to claim 1 wherein said confinement means are packages confining bees.

3. A process according to claim 1 wherein said confinement means are laboratory cages confining bees.

4. A process according to claim 1 wherein said mesh openings are about 2 mm to about 4 mm.

5. A process according to claim 1 wherein said infesting organisms comprise Varroa mites.

6. A process to claim 1 wherein said infesting organisms comprise Tracheal mites.

7. A process according to claim 1 comprising the additional step of removing said insert and counting said infesting organisms in said printed grid.

8. A process according to claim 1 comprising the additional step of removing said insert and applying a clear sheet plastic over said adhesive trapping surface to protect said infesting organisms on said adhesive trapping surface for examination and storage.

9. A process for field detection of infestation of bees comprising:

inserting into a beehive below the lowest hive body and above the hive bottom, a detector comprising a detector frame having a front sloping ramp to provide bees access to said hive body and internal grooves for retaining a replaceable insert and an insert having an upwardly facing printed grid and adhesive trapping surface and having a spaced overlying screen having openings sized to permit passage of infesting organisms while preventing passage of bees.

10. A process according to claim 9 comprising the additional step of removing said insert and counting said infesting organisms in said printed grid.

11. A process according to claim 9 comprising the additional step of removing said insert and applying a clear sheet plastic over said adhesive trapping surface to protect said infesting organisms on said adhesive trapping surface for examination and storage.

12. A detector for detection of infestation of bees comprising:

a detector frame sized to fit the opening of a beehive and having a front sloping ramp to provide bees access to a hive body and internal grooves for retaining a replaceable insert; a paperboard sheet insert having an upwardly facing printed grid and adhesive trapping surface; and a screen in spaced overlying relation to said trapping surface, said screen having openings sized to permit passage of infesting organisms while preventing passage of bees.

13. A detector of claim 12 wherein said mesh openings are about 2 mm to about 4 mm.

14. A detector of claim 12 wherein said sheet insert has an adhesive-free border surrounding said adhesive trapping surface.

15. A process for detection of infestation of bees comprising:

placing below and open to a confinement means for bees a detector system comprising an insert having an upwardly facing adhesive trapping surface and having a spaced overlying screen having mesh openings sized to permit passage of infesting organisms while preventing passage of bees and adding an infesting organism irritant to said confinement means for bees.

16. A process according to claim 15 wherein said infesting organism irritant is a acricide.

17. A process according to claim 15 wherein said infesting organism irritant is smoke.

18. A process according to claim 7 wherein said smoke comprises tobacco smoke.

19. A process according to claim 15 comprising the additional step of removing said insert and counting said infesting organisms in each of plurality of marked areas of said adhesive trapping surface.

20. A process according to claim 15 comprising the additional step of removing said insert and applying a clear sheet plastic over said adhesive trapping surface to protect said infesting organisms on said adhesive trapping surface for examination and storage.

21. A process according to claim 15 wherein said infesting organisms comprise Varroa mites.

22. A process according to claim 15 wherein said infesting organisms comprise Tracheal mites.

23. A process for field detection of infestation of bees comprising:

inserting into a beehive below the lowest hive body and above the hive bottom, a detector comprising an insert having an upwardly facing adhesive trapping surface and having a spaced overlying screen having openings sized to permit passage of infesting organisms while preventing passage of bees and adding an infesting organism irritant to said beehive.

24. A process according to claim 23 wherein said infesting organism irritant is a acricide.

25. A process according to claim 23 wherein said infesting organism irritant is smoke.

26. A process according to claim 25 wherein said smoke comprises tobacco smoke.

27. A process according to claim 23 comprising the additional step of removing said insert and counting said infesting organisms in each of a plurality of marked areas of said adhesive trapping surface.

28. A process according to claim 23 comprising the additional step of removing said insert and applying a clear sheet plastic over said adhesive trapping surface to protect said infesting organisms on said adhesive trapping surface for examination and storage.

29. A process according to claim 23 wherein said infesting organisms comprise Varroa mites.

30. A process according to claim 23 wherein said infesting organisms comprise Tracheal mites.

* * * * *